United States Patent [19]

Cunningham et al.

[11] Patent Number: 4,617,617
[45] Date of Patent: Oct. 14, 1986

[54] SUBMERSIBLE TAIL LIGHT ASSEMBLY

[75] Inventors: Alton J. Cunningham, Slinger; Brian A. Hanson, Allenton, both of Wis.

[73] Assignee: Wesbar Corporation, West Bend, Wis.

[21] Appl. No.: 731,047

[22] Filed: May 6, 1985

[51] Int. Cl.⁴ ............................................. F21V 29/00
[52] U.S. Cl. ..................................... 362/267; 362/368; 362/285
[58] Field of Search ........ 362/368, 285, 267, 307–310, 362/331

[56] References Cited

U.S. PATENT DOCUMENTS

| 2,152,789 | 8/1939 | Butler | 362/308 |
| 3,032,646 | 5/1962 | Chieger | 362/278 |
| 3,106,349 | 10/1963 | Bloodgood, Jr. | 362/368 |
| 3,445,645 | 5/1969 | Newman | 362/235 |
| 3,858,039 | 12/1974 | Moore | 362/285 |
| 4,281,367 | 7/1981 | Moore et al. | 362/96 |
| 4,390,931 | 6/1983 | Gorick et al. | 362/306 |
| 4,506,314 | 3/1985 | Moore | 362/368 |

Primary Examiner—E. Rollins Cross
Attorney, Agent, or Firm—Andrus, Sceales, Starke & Sawall

[57] ABSTRACT

A submersible tail light assembly for a boat trailer. The tail light assembly includes an outer housing having an open outer end that is enclosed by a tail light lens. A transparent capsule having an open inner end is sealed to the wall of the housing, and a bulb socket that carries a light bulb is mounted on the inner wall of the housing and is located within the capsule. The electrical leads connected to the bulb socket extend through an opening in the lower portion of the inner wall of the housing. In some cases the housing may also have an open side enclosed by a side marker lens and a side marker bulb socket and bulb are mounted in the housing in alignment with the side marker lens. When the trailer light is submerged in water during launching of a boat, air is entrapped within the capsule preventing water from rising in the capsule to the level of the bulb socket and bulb. The bulb can be conveniently replaced by removing the lens and capsule from the housing.

12 Claims, 5 Drawing Figures

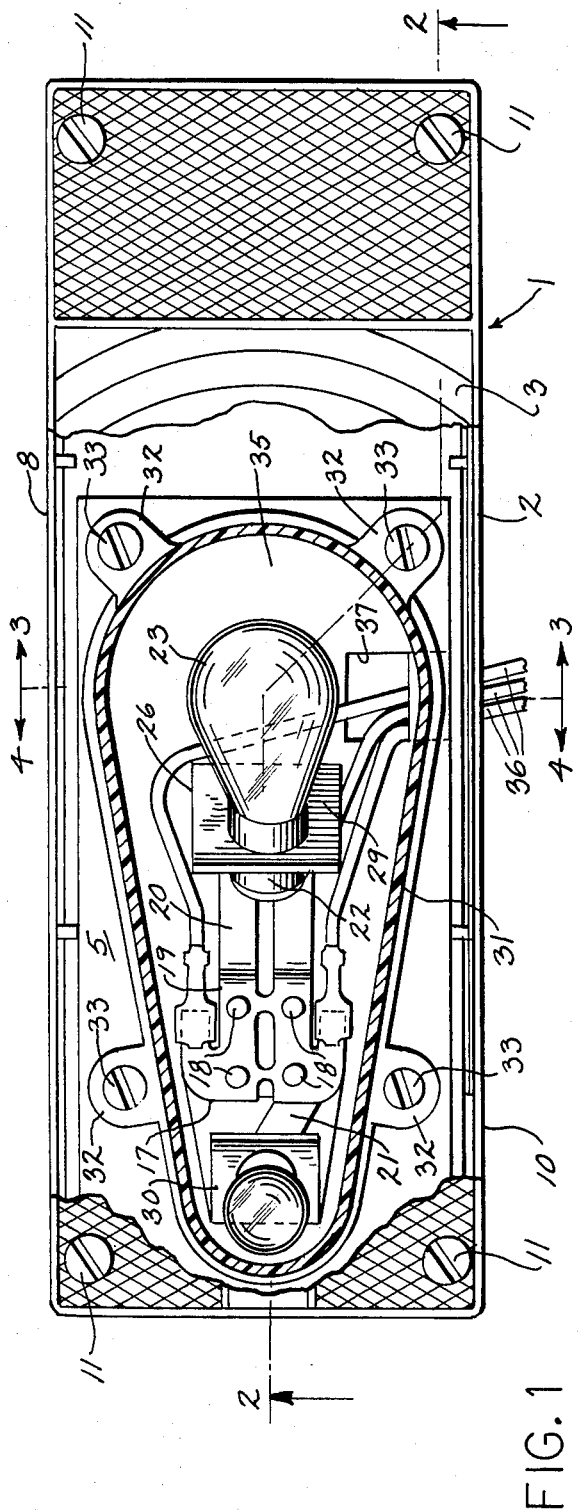
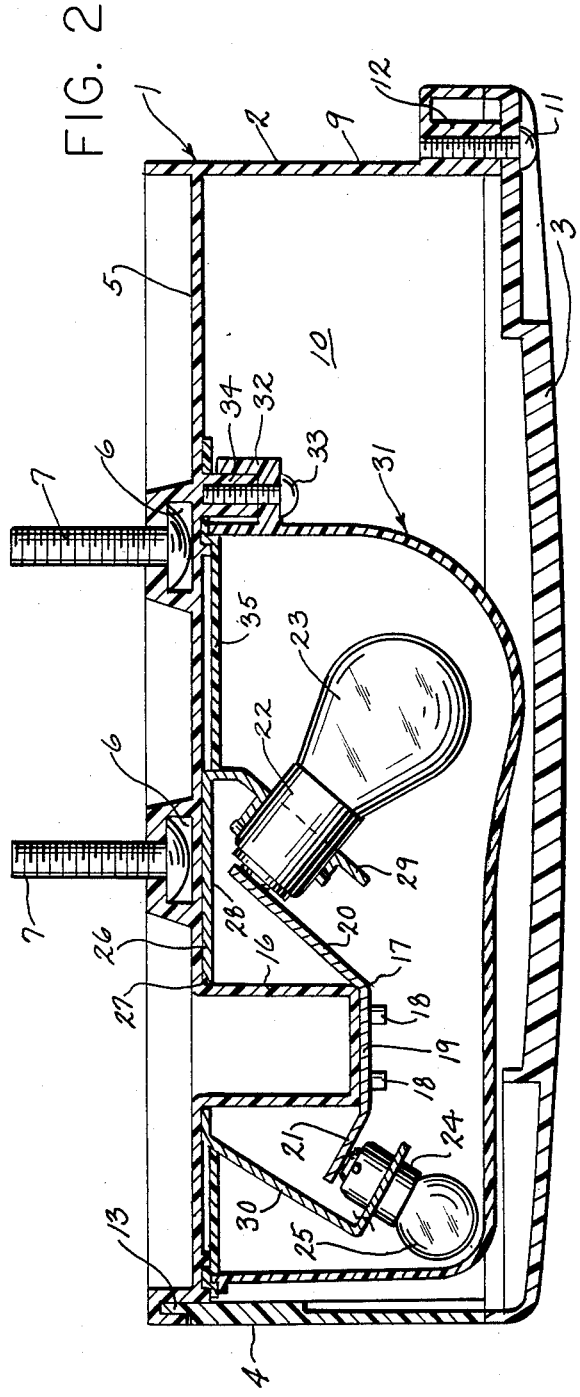
FIG. 1
FIG. 2

SUBMERSIBLE TAIL LIGHT ASSEMBLY

BACKGROUND OF THE INVENTION

When launching a boat from a trailer, the boat trailer is backed down the launching ramp to a position where the trailer lights will normally be submerged in the water. With the conventional boat trailer light, as used in the past, water enters the trailer light when the lights are submerged and contacts the light bulb and socket. Over a period of time, with repeated launchings, the contact of the bulb and socket with the water, particularly in salt water areas, will rapidly corrode the socket making it very difficult, if not impossible, to remove the bulb from the socket for replacement. As a further problem, during night launching or when waiting at a launching site, the bulbs may be lit for extended periods of time. When the trailer lights are then submerged, the cold water contacting the hot bulb may break the bulb, requiring replacement.

In an attempt to overcome the corrosion and breakage problems of trailer lights it has been proposed to fully seal the lens to the housing of the tail light through gaskets to prevent water from entering the housing when the light is submerged. However, the sealed tail light construction is relatively expensive and extreme care must be taken to properly seal the lens to the housing on replacement of the bulb.

To eliminate the problems in connection with the fully sealed tail light, tail lights have been marketed which operate on the air entrapment principle. As disclosed in U.S. Pat. No. 3,106,349 the bulb socket and bulb are located within the upper end of a housing, the upper end of which sealed and the lower end is open. When the light is submerged in water, air will be entrapped in the upper portion of the housing preventing the water from rising to a level where it will contact the bulb or socket.

U.S. Pat. No. 3,858,039 describes an improvement to the basic tail light operating on air entrapment principles. In this latter patent, the bulb and socket are mounted on a slide that can be removed from the lower open end of the housing to facilitate replacement of the bulb.

SUMMARY OF THE INVENTION

The invention is directed to an improved submersible tail light assembly for a boat trailer. In accordance with the invention, the tail light assembly includes an outer housing having an inner wall mounted to the trailer and having an open outer end, and in some cases, an open side, which are enclosed by a tail light lens and a side marker lens respectively.

Positioned within the housing is a transparent capsule having an open end which is sealed to the inner wall of the housing.

An electrical socket that carries a light bulb is mounted on the rear wall of the housing and are located within the capsule. Electrical leads connected to the bulb socket extend through an opening in the lower portion of the inner wall of the housing.

When the trailer is submerged during launching, air is entrapped in the upper portion of the capsule, preventing water from rising to the level of the bulb socket and light bulb in the capsule. As the water is not in contact with the socket or bulb, corrosion of the socket is minimized and breakage of bulbs due to exposure to cold water is prevented.

The bulb can be conveniently replaced by removing the lens and the capsule from the housing.

The tail light assembly of the invention is particularly adaptable for use in a low profile configuration in which the light is elongated in a horizontal direction and has a minimum vertical height.

The tail light can incorporate both a tail light lens and a side marker lens with separate bulbs for each lens.

Water entering the capsule during launching of the boat trailer will readily drain from the capsule as the trailer is removed from the water and yet the drain opening is designed to prevent splashing of water into the capsule when the trailer is being transported.

As neither the tail light lens, nor the side marker lens is sealed to the housing, the construction eliminates complicated sealing or gasketing problems.

DESCRIPTION OF THE DRAWINGS

The drawings illustrate the best mode presently contemplated of carrying out the invention.

In the drawings:

FIG. 1 is a front elevational view of the tail light assembly of the invention with parts broken away;

FIG. 2 is a horizontal section taken along line 2—2 of FIG. 1;

DESCRIPTION OF THE ILLUSTRATED EMBODIMENT

Figure 3:
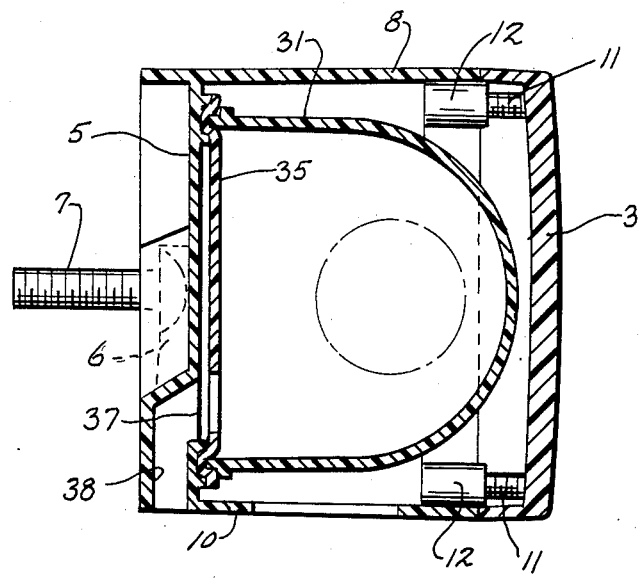
FIG. 3 is a vertical section taken along line 3—3 of FIG. 1.
Figure 4:
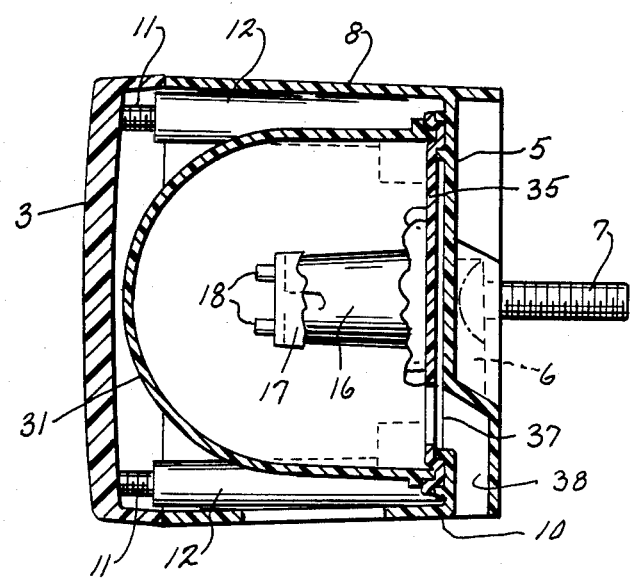
FIG. 4 is a section taken along line 4—4 of FIG. 1.

The drawings illustrate a submersible tail light assembly 1 consisting of a housing 2 having an open outer end enclosed by a tail light lens 3 and an open side enclosed by a side marker lens 4.

Housing 2 is composed of an inner wall 5 which is adapted to be connected to the boat trailer. In this regard, the rear wall is provided with a pair of open ended slots 6 which receive the heads of carriage bolts 7 that act to secure the housing to the boat trailer.

Housing 2 also includes a top wall 8, a side wall 9, and a bottom wall 10.

To secure the tail light lens 3 to the housing 2, a series of screws 11 extend through openings in the corners of lens 3 and are threaded into bosses 12 formed on housing 2.

Figure 5:
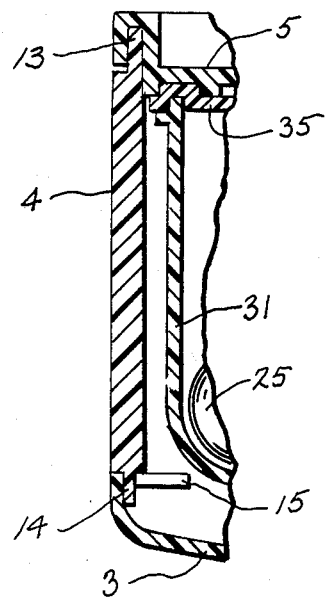
FIG. 5 is an enlarged view of vertical side edge of FIG. 2.

The vertical side edges of side marker lens 4 are interconnected with the wall 5 of housing 2 and with the adjacent side edge of the tail light lens 3. In this regard, one side edge of the side marker lens 4 is provided with a vertically extending lip 13 which is received within a groove in rear wall 5, while the opposite side edge of lens 4 is formed with a pair of lips or flanges 14 which are received between the edge of lens 3 and a pair of locating nibs 15 on lens 3, as best shown in FIG. 5.

As best illustrated in FIG. 2, a pedestal or post 16 extends outwardly from inner wall 5 and a contact strip 17 is secured to the end of post 16 by screws 18. Contact strip 17 includes a central section 19 and a pair of bent end sections 20 and 21. End section 20 is in electrical contact with the base of a bulb socket 22 which carries a tail light bulb 23, while the other bent end section 21 is in electrical contact with the base of a bulb socket 24 which carries a side marker bulb 25.

Bulb sockets 22 and 24 are mounted to wall 5 of housing 2 by bulb mounting strap 26. Strap 26 has an opening 27 which fits around post 16 and strap 26 includes a flat central section 28 that bears against wall 5. A bent section 29 extends at an angle to section 28 and has an opening to receive bulb socket 22, while an L-shaped section 30 projects from the opposite end of section 28 and as an opening to receive the side market bulb socket 24.

Bulbs 23 and 25 are contained within a transparent capsule 31 having an open inner end that is sealed to the wall 5 of housing 2. As shown in FIG. 3, capsule 31 has a generally curved or dome-like contour and the periphery of the capsule bordering the open end is provided with a plurality of legs 32 which are secured by screws 33 to bosses 34 on wall 5. The open end of capsule 31 is sealed to wall 5 through a sealing gasket 35.

The electrical leads 36 which are connected to the bulb sockets 22 and 24 extend outwardly through an opening 37 in the lower portion of wall 5. As illustrated in FIG. 3, the opening 37 is provided with an offset portion 38 which faces downwardly and terminates at the bottom of the housing.

When the boat trailer is launched and the tail light assembly is submerged in water, air will be entrapped in the capsule which will prevent the water from rising to the level of the bulb sockets 22 and 24 and bulbs 23 and 25. Thus, corrosion of the bulb sockets and bulbs will be minimized and breakage of the bulb due to exposure to cold water will be prevented.

To remove and replace the bulbs, screws 11 are removed and the lenses 3 and 4 disassembled from the housing 2. By removal of screws 33 the capsule 31 can be disengaged from the housing wall 5, so that the bulbs will then be accessible for replacement.

The tail light assembly of the invention is particularly adaptable for use in a low profile contour in which the light is elongated in a horizontal direction and has a minimum vertical depth. However, the invention can be incorporated with tail light assemblies of other configurations. As neither the tail light lens 3 or the side marker lens 4 are sealed to the housing the gasketing problems normally associated with a fully sealed tail light are eliminated.

Various modes of carrying out the invention are contemplated as being within the scope of the following claims particularly pointing out and distinctly claiming the subject matter which is regarded as the invention.

We claim:

1. A submersible tail light assembly for a boat trailer, comprising an outer housing having a wall and an open end, a lens to enclose the open end, a transparent capsule disposed in the housing and having an open end facing said wall, sealing means for sealing the open end of said capsule to said wall, a bulb socket disposed within the capsule, a light bulb mounted in the socket, passage means providing communication between the lower portion of the interior of said capsule and the exterior, and electrical leads connected to said bulb socket for supplying electrical power to said bulb, submerging the light assembly in water causing said water to enter the capsule through said passage means to entrap air in the upper end of the capsule and prevent the water from rising to the level of said socket and bulb.

2. The tail light assembly of claim 1, wherein said bulb socket is mounted on said wall.

3. The tail light assembly of claim 1, wherein said housing also has an open side adjacent said open opposite end and said assembly includes a side marker lens enclosing said open side, a second bulb socket disposed in said capsule and aligned with said side marker lens, and a second light bulb mounted in said second bulb socket.

4. The tail light assembly of claim 1, wherein said capsule is generally dome-shaped.

5. The tail light assembly of claim 1, and including mounting means on the outer surface of said wall to mount the housing to a boat trailer.

6. The tail light assembly of claim 2, and including a post disposed on said wall and extending into said capsule, a contact strip mounted on the post and electrically connected to said bulb socket, said electrical leads being connected to said contact strip.

7. The tail light assembly of claim 3, and including first interlocking means for interlocking one side edge of the side marker lens to said wall, and second interlocking means for interlocking the opposite side edge of said side marker lens to said tail light lens.

8. A submersible tail light assembly for a boat trailer, comprising an outer housing having an end wall and having an open end opposite said end wall, a lens to enclose said open end, a transparent sealed capsule disposed within the housing and having an open end facing said end wall, sealing means for sealing the open end of said capsule to said end wall, a bulb socket mounted on said end wall and disposed within said capsule, a light bulb carried by said bulb socket, the lower portion of said end wall having an opening providing communication between the exterior and the lower portion of the interior of said capsule, and a plurality of electrical leads extending through said opening and connected to said socket for supplying electrical energy to said socket, submerging the light assembly in water causing said water to enter the capsule through said opening to entrap air in the upper end of the capsule and prevent the water from rising to the level of said socket and bulb.

9. The tail light assembly of claim 8, wherein said opening extends horizontally from the interior of said housing and then downwardly and terminates at the lower end of said end wall.

10. A submersible tail light assembly for a boat trailer, comprising an outer housing having a wall and having an open end, a lens to enclose said open end, a capsule disposed in the housing and having an open portion facing said wall, sealing means for sealing said open portion to said wall, a bulb socket disposed within the capsule, a light bulb mounted in the socket, at least a portion of the capsule that is disposed in alignment with said light bulb being transparent, passage means providing communication between the lower portion of the interior of said capsule and the exterior, said socket and bulb disposed at a level above the entry of said passage means to the interior of said capsule, and electrical leads connected to said bulb socket for supplying electric power to said bulb, submerging of said light assembly in water causing said water to enter the interior of said capsule through said passage means to entrap air in the upper end of said capsule and prevent said water from rising to the level of said socket and bulb.

11. The tail light assembly of claim 10, wherein said electrical leads extend through said passage means.

12. The tail light assembly of claim 10, wherein said passage means includes an opening in said wall that communicates with the interior of said capsule.

* * * * *